Dec. 30, 1969     E. BREDE ET AL     3,486,379
GRAVIMETER
Filed July 19, 1967
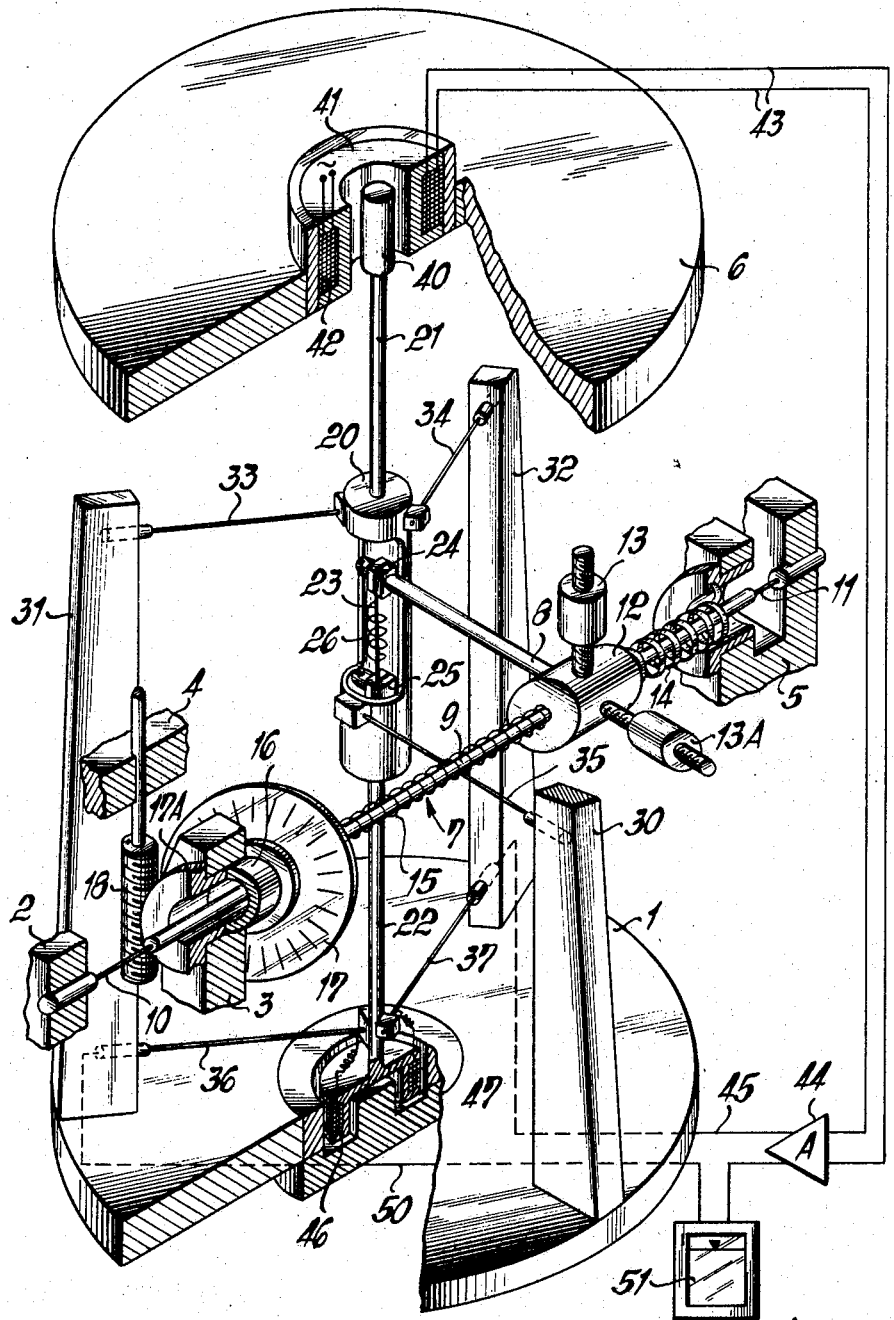
INVENTORS
Ernst BREDE
Reinhard SCHULZE
Eberhard THEBIS United States Patent Office 3,486,379
Patented Dec. 30, 1969

3,486,379
GRAVIMETER
Ernst Brede, Reinhard Schulze, and Eberhard Thebis, Berlin, Germany, assignors to Continental Elektroindustrie A.G., Berlin-Mariendorf, Germany, a corporation of Germany
Filed July 19, 1967, Ser. No. 654,461
Claims priority, application Germany, July 28, 1966, C 39,735
Int. Cl. G01m 1/12
U.S. Cl. 73—382                                            11 Claims

ABSTRACT OF THE DISCLOSURE

To minimize or obviate cross-coupling effects in gravimeters, the active sensing mass of the gravimeter is guided for rectilinear displacement in the vertical direction and is linked by a spring-tauted filament to a lever arm which is mounted on a horizontal journal rod and has its center of gravity located on the journal axis. The mass is subject to restoring force, and its departure from a zero position furnishes an electric signal output indicative of the gravity being measured. The restoring force is partly or entirely provided by an electromagnet controlled in response to the signal output.

---

Our invention relates to apparatus for measuring gravity from a moving platform such as a travelling ship, aircraft or other vehicle. More specifically, the invention concerns a gravimeter whose gravity-responsive mass is rotationally displaceable against restraining forces and which is equipped with a device for converting the positional relation of the mass to a given reference into a corresponding electrical magnitude, as well as with measuring means for determining this electrical magnitude as indicative of the gravitation force acting upon the mass.

It is known to provide such gravimeters with a straight-motion guide for the gravimeter mass for limiting its gravity-responsive travel to a plane perpendicular to the journal axis of the mass. Known gravimeters of this type serve to measure terrestrial gravity from ships or aircraft travelling along a given course. In one of these gravimeters, a platform gyrostabilized in a horizontal plane supports the gravimeter housing in which the gravimeter mass comprises a lever journalled about a rotational axis and is guided by restraining wires, extending between the lever and the journal shaft, for motion in a plane perpendicular to the journal axis. The individual points of the gravimeter mass, therefore, can move only on circles about the journal axis.

Gravimeters of this and similar types are affected by the so-called cross-coupling effect which manifests itself upon occurrence of given phase relations between the accelerating forces acting in the horizontal plane upon the gravimeter mass and those forces that act in the vertical plane. This effect has the consequence that, although the mass is restrained to move in the vertical plane only, spurious additional faces may become superimposed upon the forces primarily acting in the vertical plane, thus falsifying the measuring result (J. C. Harrison: "The Measurement of Gravity at Sea" in "Methods and Techniques in Geophysics," Intersci. Publ. Lim., London, 1960).

It is, therefore, an object of our invention to improve the known gravimeters of the above-mentioned type, in such a manner that forces which act in the horizontal plane and have an effect upon the gravimeter mass will not falsify the measuring result. It should be understood that the term "horizontal plane" as here used does not necessarily denote a plane extending horizontally in the strict sense, but always applies to a plane in which the journal axis of the gravimeter mass is located. If the gravimeter is installed in space-travel vehicles, this plane, of course, need not be a "horizontal plane" in the terrestrial sense. For simplicity, however, the invention will be described herein with reference to terrestrial use of the gravimeter, in which case the term "horizontal plane" is in fact a horizontal plane in the terrestrial sense.

To achieve the above-stated object, and in accordance with a feature of our invention, we connect the gravimeter mass in apparatus of the general type aforementioned, through an antifriction or friction-poor link with a lever arm rotatable about a journal or fulcrum axis, and we provide a straight-motion guide which confines the mass to rectilinear motion in a plane perpendicular to the journal axis; and we further make the gravity center of the lever coincide with a point on the journal axis.

In gravimeters embodying these features of our invention, the above-mentioned cross-coupling effect can no longer occur because the forces acting upon the lever arm and effective in the horizontal plane cannot displace the lever arm on account of the particular position which its gravity center occupies relative to the journal axis; and such force components also fail to affect the rectilinear displacement of the gravimeter mass since the direction of attack of such forces always extends perpendicularly to the travel direction of the mass.

According to further features of our invention, it is preferable to subject the gravimeter mass to elastic restoring forces; and the arrangement preferably is such that the electrical device, which furnishes a signal indicative of the relative mass position, controls an electromagnet or other power source to produce another force acting upon the gravimeter mass in opposition to its gravity-responsive displacement. We preferably provide for complete force compensation so that a departure of the gravimeter mass from a given zero position will substantially not take place, irrespective of the magnitude of the forces acting upon the mass and in the vertical direction.

If desired, the torsion spring 14 may be eliminated and the elastic restoring forces provided by the pretensioning of the springs 14 and 26 may be dispensed with, and the restoring forces may be produced only electrically or electromagnetically in the manner just mentioned. In this case, the non-elastic restoring device must compensate the weight of the gravimeter mass in the zero position.

The above-mentioned and further features of our invention, said features being set forth with particularity in the claims annexed hereto, will be apparent from the embodiment of a gravimeter according to the invention illustrated by way of example in the accompanying drawing, which shows in a single figure a part-sectional and perspective diagram of the apparatus together with a schematic representation of an appertaining electric circuit diagram.

The structures denoted by 1, 2, 3, 4, 5 and 6 are rigidly connected with the gravimeter housing or are integral therewith. When the apparatus is in use, for example on a ship, the housing is mounted upon a gyro-stabilized platform so that the journal axis 7 of the gravimeter is always located in a horizontal plane.

The journal axis 7 is identical with the longitudinal axis of a rod 9 on which a lever arm 8 is rotationally seated by means of a bearing sleeve 12 to which the arm 8 is attached. The rod 9 is held at both ends by tensioning wires 10 and 11 in the respective structures 2 and 5 of the housing and hence can rotate about its own axis 7 for the purpose of forming the journal axle for the gravimeter mass. The tensioning wires 10 and 11 are fastened in structures 2 and 5 by means of respective clamping bushings. The sleeve 12 further carries two calibrating weights 13 and 13A which are in threaded engagement with screw spindles rigidly secured to the sleeve 12 and extending at an angle of 90° relative to each other. The weights 13 and 13A permit calibrating the system so that the center of gravity of the lever arm 8 is located on the journal axis 7.

A helical torsion spring 14 coaxially surrounding the axis of the rod 9 has one end fastened to the fixed structure 5 and the other end affixed to the sleeve 12. A second helical torsion spring 15 extends between and is affixed to each of the sleeves 12 and the hub 16 of a circular dial disc 17 of glass which carries a scale of protractor indicia. The hub 16 is rotationally mounted in the fixed structure 3 and carries a worm gear 17a meshing with a worm spindle 18. The spindle 18 is journalled in the fixed structure 4 and serves to rotationally adjust the hub 16 with the dial disc 17. The rod 9 extends coaxially through an opening of the hub 16 and through an opening of the disc 17, so that turning the spindle 18 causes said disc to rotate and to correspondingly vary the tension of the spring 15. The angular position of the dial disc 17, being a measure of the force exerted by the spring 15 upon the sleeve 12 and therefore the lever 8, can be read from the outside of the gravimeter with the aid of an optical reading device of the microscope type, which is not illustrated.

A hollow sleeve-shaped component 20 is provided with two rod-shaped inserts 21 and 22. A metal filament 23 has one end fastened by means of a clamp 24 to the lever 8. The other end of the filament is fastened by a clamp 25 to the sleeve-shaped component 20. A helical compression and torsion spring 26 coaxially surrounding the filament 23 is fastened at its ends to the lever 8 and the sleeve 20 by the same respective clamps 24 and 25.

The structure 1, rigidly joined with the housing, constitutes the base plate of the gravimeter system. The plate 1 carries three columns 30, 31 and 32 which serve as abutments for filamentary tensioning members consisting of tapes, braids, or preferably, and, as shown, of wires 33, 34, 35, 36 and 37. One end of each wire is secured in a sleeve by cementing or soldering, and these sleeves are fastened by non-illustrated means in the columns 30, 31 and 32 respectively. The other ends of wires 33, 34, 35 are similarly fastened by clamps to the sleeve-shaped component 20. The tensioning wires 33 and 34 are located in the same plane, and this plane is spaced from the plane in which the wires 36 and 37 are located, the two wires of each plane being 120° displaced from each other. The wires 34 and 37 are parallel to each other, as are the wires 33 and 36. The tensioning wire 35 is located in a plane intermediate the two aforementioned planes and is connected with the sleeve-shaped component 20 at a point 120° displaced from the other wires 33 and 34, and 36 and 37. The helical spring 26 inside the component 20 is pre-tensioned by torsion, with the effect that the five wires 33, 34, 35, 36 and 37 are kept taut under tension. The spring 26 also acts as a pressure spring with the effect that the filament 23 is always kept taut under tension independently of the forces acting upon the gravimeter mass.

The filament 23 forms an articulate link connecting the lever arm 8 with the gravimeter mass constituted by the component 20 and its inserts 21 and 22. The five wires 33, 34, 35, 36 and 37 constitute a straight-motion guide for the mass and permit it to become displaced only in a rectilinear (vertical) direction.

Connected to the top of the rod-shaped insert 21 is the iron core 40 of a differential transformer which comprises a coil carrier 41 with primary and secondary windings 42 coaxially mounted thereon. When the transformer 40, 41, 42 is energized by primary alternating voltage, the secondary winding provides an alternating voltage having an amplitude which is zero in the zero position of the core 40 and increases in linear relation to the amount of departure when said core departs from the zero position.

The phase angle of the alternating output voltage between the output leads 43 of the differential transformer 40, 41, 42 is shifted 180° in phase (electrical) when the core 40 passes through its zero position. The output voltage in the leads 43 is supplied to a power amplifier 44 which controls a direct current. The direct current is supplied by a lead 45 to the excitation winding 46 of an electromagnetic system.

Differential transformers of the type described are known as such. The secondary winding of a differential transformer comprises two coils which have equal numbers of turns and are connected in series opposition to each other. When the core 40 is centered, the alternating voltages induced in the two coils of the secondary winding just cancel each other. When the core is displaced from the center in one direction or the other, the alternating voltage of one or the other coil of the secondary winding will predominate. (See, for example, McGraw-Hill Encyclopedia of Science and Technology, vol. 10, p. 584.)

The excitation winding 46 and its carrier are movable in the air gap of a permanent magnet 47 and are affixed to the lower end of the rod-shaped insert 22. The output lead 45 of the amplifier 44 extends through the interior of the column 32 and is insulated therefrom. In the column 32, the lead 45 is electrically connected with the lower tensioning wire 37, said tensioning wire being insulated from the insert rod 22 as well as from the column 32. The tensioning wire 36 is similarly insulated from the insert rod 22 and the column 31 and has its end connected to a lead 50 from the amplifier 44. In this manner, the wires 36 and 37 serve to supply current from the amplifier 44 to the coil 46 via the circuit 44, 45, 37, 46, 36, 50.

Connected in the output lead 50 of the amplifier 44 is a recorder 51 which produces on a tape or chart a record of the current intensity either in analog form or intermittently in digital form as a function of time, or also as a function of the geographic locality of the gravimeter.

The arrangement is such that the electromagnetic system 46, 47 produces a force which acts in opposition to the motion of the gravimeter mass. In fact, therefore, the forces acting in the vertical plane have the effect that no more than a slight departure of the gravimeter mass from its zero position can occur.

The spring 15 serves in the conventional manner for adjusting the zero position of the gravimeter and for calibrating the indication on the scale of the dial disc 17.

The aforedescribed apparatus according to the invention operates as follows. As mentioned, the apparatus is mounted on a platform stabilized in the horizontal plane by means of gyro devices. Hence, the journal axis 7 is located in a substantially horizontal plane. The forces acting upon the gravimeter mass 20, 21, 22 in the horizontal plane have the effect that the mass tends to rotate about its longitudinal axis. The spring 26 is pretensioned to such an extent that a torsional effect occurs only when the forces exceed a given amount, for example 200,000 milligal (mgal). This tension bias contains a safety factor in the order of magnitude two, since generally the forces occurring in practice do not exceed 100,000 mgal.

Forces which act in the vertical direction upon the gravimeter mass 20, 21, 22 cause deflection of said mass. The apparatus is so set, with the aid of water levels or other inclination sensors, that the direction of mass deflection is vertical. Such deflection is converted by the differential transformer 40, 41, 42 into an electrical alternating voltage which is supplied to the input of the amplifier 44. The amplifier 44 controls a direct current passing through the coil 46 and generating a force opposed to the deflecting motion of the gravimeter mass 20, 21, 22. This opposing force has a magnitude and direction which permit the gravimeter mass 20, 21, 22 virtually no more than slight departures from the zero position.

The recorder 51 registers the forces acting upon the gravimeter mass 20, 21, 22 in the vertical direction. If desired, auxiliary means may be used for determining the average time of the gravimeter mass movement, or rather of the forces acting upon it, thereby to enable the determination of the static gravity value for any geographic or time point.

Due to the proportional operation of the regulating equipment constituted by the components 40, 41, 42, 44, 46 and 47, the linear measuring range of the gravimetric measuring device illustrated and described by way of example is relatively small. However, this measuring range may be widened by providing the closed-loop control system of the regulating means with a time behavior departing from straight proportionality. For example, a regulating control system of the proportional-integral type may be employed if a larger measuring range is desired.

Upon a study of this disclosure it will be obvious to those skilled in the art that our invention is not limited to the particular embodiment disclosed but may be modified in various respects without departing from the essential features of our invention and within the scope of the claims annexed hereto.

We claim:

1. Apparatus for measuring gravitational forces from a moving locality, comprising a structure supported in a horizontal plane; a gravitational mass; an axle mounted on said structure and defining a horizontal journal axis, a lever arm mounted on said axle and having its gravity center on said axis; an antifriction link connecting said gravitational mass with said lever arm; restoring-force means coupled between said structure and said gravitational mass for biasing said mass to a zero position, said lever arm providing a coupling for the action of said restoring-force means on said gravitational mass; guide means affixed to said structure and coupled to said gravitational mass for restricting said gravitational mass to a rectilinear path of gravity-responsive motion away from said zero position in a plane perpendicular to said journal axis; and electric control means responsive to the position of said mass relative to said structure to provide an electric output signal indicative of the gravity to be measured.

2. In apparatus according to claim 1, said link comprising a filament by means of which said gravitational mass, is suspended from said lever arm, and a pressure spring disposed between said mass and said arm for tensioning said filament.

3. In apparatus according to claim 1, said guide means comprising at least three filamentary tensioning members of which each has one end fastened to said structure and the other end fastened to said mass, said three members being angularly displaced 120° from each other and tangentially directed to said mass.

4. In apparatus according to claim 1, said guide means comprising five filamentary tensioning members of which each has one end fastened to said structure and the other end fastened to said mass, said members extending taut in substantially tangential directions relative to said mass, two of said five filamentary members being angularly spaced 120° from each other in a first plane transverse to the direction of said rectilinear path, two other ones of said members being located in another transverse plane spaced in said direction from said first plane, said other members being parallel to said first two members, and the fifth filamentary member being located in a third transverse plane intermediate said first and second planes and being 120° displaced from each of the other four members.

5. In apparatus according to claim 3, further comprising spring means connected between said arm and said mass for imparting a torque to said mass to maintain said filamentary members in tension.

6. In apparatus according to claim 5, said spring means comprising a torsional spring common to said filamentary members.

7. In apparatus according to claim 3, said gravitational mass being rotatable about said rectilinear path and relative to said lever arm, and spring means mounted between said arm and said mass for imparting to said mass a torque for tensioning said filamentary members.

8. In apparatus according to claim 1, said restoring-force means comprising elastic spring bias means.

9. In apparatus according to claim 8, said spring bias means comprising a helical torsion spring coaxial to said journal axle and mounted between said structure and said lever arm.

10. In apparatus according to claim 1, said restoring-force means comprising an electromagnetic device having two interacting magnet members joined with said gravitational mass and with said supporting structure respectively and having an electric control circuit for varying the magnetic force acting upon said mass.

11. In apparatus according to claim 10, said control circuit being connected to said position-responsive control means so as to vary said magnetic force in dependence upon departure of said gravitational mass from said zero position.

References Cited

UNITED STATES PATENTS

| 2,183,115 | 12/1939 | Boucher | 73—382 |
| 3,323,372 | 6/1967 | Kistler et al. | 73—517 |

JAMES J. GILL, Primary Examiner

JOHN R. FLANAGAN, Assistant Examiner